US008133150B2

(12) United States Patent  
Rogg

(10) Patent No.: US 8,133,150 B2  
(45) Date of Patent: Mar. 13, 2012

(54) DRIVE SYSTEM FOR AN INDUSTRIAL TRUCK WITH AN INTERNAL COMBUSTION ENGINE

(75) Inventor: Andreas Rogg, Lübeck (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 561 days.

(21) Appl. No.: 11/772,913

(22) Filed: Jul. 3, 2007

(65) Prior Publication Data

US 2008/0041653 A1 Feb. 21, 2008

(30) Foreign Application Priority Data

Jul. 5, 2006 (DE) .......................... 10 2006 030 945

(51) Int. Cl.  
*B60K 6/365* (2007.10)
(52) U.S. Cl. ............................. 477/3; 475/5; 180/65.27
(58) Field of Classification Search ........................ None  
See application file for complete search history.

(56) References Cited

U.S. PATENT DOCUMENTS

| 3,566,717 A | 3/1971 | Berman et al. ................... 74/859 |
| 2008/0009380 A1* | 1/2008 | Iwanaka et al. ................... 475/5 |
| 2008/0176706 A1* | 7/2008 | Wu et al. ........................... 477/5 |

FOREIGN PATENT DOCUMENTS

| DE | 101 41 923 A1 | 3/2002 |
| DE | 103 40 472 A1 | 6/2005 |

* cited by examiner

*Primary Examiner* — Sherry Estremsky  
(74) *Attorney, Agent, or Firm* — Vidas, Arrett & Steinkraus, P.A.

(57) ABSTRACT

A drive system with either a four-shaft epicyclic gearing consisting of two fixed links or one fixed link. A first shaft is coupled to an engine and a second shaft is connected to a first electric motor. The electric is coupled to the power supply of the industrial truck. A brake is coupled to a third shaft of the gearing, while a fourth shaft is coupled to a change gear. The change gear is coupled to a summing gear, the other input shaft connected to a second electric motor connected to the power supply. The output shaft is coupled to a driven wheel of the truck. A sensor device detects the speed of the engine and of the two motors. A control and regulating device sets the speeds and/or torque of the motors and of the engine according to setpoint signals and the output signals of the sensor device.

48 Claims, 6 Drawing Sheets

DRIVE SYSTEM FOR AN INDUSTRIAL TRUCK WITH AN INTERNAL COMBUSTION ENGINE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Hybrid drives for motor vehicles have been known for a long time. In U.S. Pat. No. 3,566,717, the entire contents of which is incorporated herein by reference, a drive system for motor vehicles is disclosed in which the shaft of the internal combustion engine is coupled to the first shaft of a three-shaft epicyclic gearing. A first electric motor is coupled to the second shaft of the three-shaft epicyclic gearing. The third shaft is coupled to a second electric motor and to the wheels of the vehicle. The power transfer is carried out as power split, partly on the mechanical path via the third shaft of the epicyclic gearing and the remaining part on the electrical path from the first to the second electric motor. The transmission ratio, which acts from the internal combustion engine on the wheels of the vehicle is set by the speed ratio of the internal combustion engine and the first electric motor. The known arrangement may be used as a stepless gear mechanism but due to the internal power flows is only suitable for one direction of travel.

A drive system for motor vehicles has become known from DE 101 41 923, the entire contents of which is incorporated herein by reference, in which the shaft of the internal combustion engine is coupled to the first shaft of a three-shaft epicyclic gearing. A first electric motor is connected to the second shaft of the epicyclic gearing and the third shaft is coupled to a second electric motor and the wheels of the vehicle. For reverse driving, the connection of the third shaft of the epicyclic gearing to the second electric motor and the wheels of the vehicle is separated by a clutch, and the shaft of the internal combustion engine and the shaft of the first electric motor are connected by means of a clutch, so that electrical power transfer is possible in series from the first electric motor operating in the manner of a generator to the second electric motor. For switching between power split mode and series mode it is essential to reduce the power transferred from the internal combustion engine to the wheels to zero.

A drive system for industrial trucks has become known from DE 103 40 472, the entire contents of which is incorporated herein by reference, in which the shaft of the internal combustion engine is coupled to the shaft of a three-shaft epicyclic gearing. A first electric motor is connected to the second shaft of the epicyclic gearing, and a third shaft is connected to a change gear, the output shaft thereof being connected to a summing gear. A second electric motor is connected to the other input shaft of the summing gear, the output thereof acting on the wheels. A lock-up clutch on the three-shaft epicyclic gearing allows electrical operation in series, in which power generated by the internal combustion engine is converted by the first electric motor into electrical current, which is supplied to the second electric motor as drive current. To this end, the change gear is shifted into a neutral position. Forward and reverse driving is possible in series mode. Moreover, forward and reverse driving is possible in power split mode, by the change gear being shifted into the shift stage belonging to the respective direction of travel. For shifting between power split mode and series mode, when using a transmission step associated with the lock-up clutch, it is possible to keep constant the power transferred from the internal combustion engine to the wheels in a speed synchronous power shift.

Generally, the clutches are designed as hydraulically actuated multi-plate clutches. In the known manner hydraulically actuated clutches generally comprise co-rotating pistons so that the pressure medium required for actuation has to be transferred to rotating parts which is structurally expensive and susceptible to maintenance.

The object of the invention is to provide a hybrid drive system for industrial trucks which offers a stepless adjustment of the transmission, good controllability and good efficiency. Operating functions of the industrial truck are also intended to be fulfilled in addition to the travel drive, zero emission operation being also intended to be possible, at least occasionally, in addition to the operation of an internal combustion engine as a primary energy source, in order to drive through warehouses or containers. Finally, with the drive system high acceleration, hill climbing ability and high driving speeds are intended to be achieved both in the forward and the reverse directions of travel.

BRIEF SUMMARY OF THE INVENTION

In the drive system according to the invention either a four-shaft epicyclic gearing consisting of two fixed links or an epicyclic gearing consisting of one fixed link is provided. A first shaft is coupled to the internal combustion engine and a second shaft is mechanically connected to a first electric motor. The electric motor is coupled electrically to the onboard power supply of the industrial truck. A brake is coupled to a third shaft of the epicyclic gearing, whilst a fourth shaft is coupled to a change gear. The change gear is coupled to a summing gear, the other input shaft thereof being connected to a second electric motor connected to the onboard power supply. The output shaft thereof is coupled to a driven wheel of the industrial truck. A sensor device detects the speed of the internal combustion engine and of the first and second electric motor. A control and regulating device sets the speeds and/or torque of the electric motors and of the internal combustion engine according to setpoint signals and the output signals of the sensor device. Moreover, the motor operation and generator operation of the electric motors and the actuation of the change gear and brake is controlled.

If with the drive system according to the invention the brake is not actuated, the four-shaft epicyclic gearing operates as a differential drive. When activating the brake, the epicyclic gearing is converted into a positive gearing with a fixed gear ratio between the separate shafts. The drive system according to the invention allows both electrical operation in series and electrical power split operation. In addition, purely electrical operation with zero emissions is possible in association with an electrical energy accumulator.

It is understood that the driven wheel and the internal combustion engine may be exchanged relative to their position on the gear arrangement.

The change gear may be a reversing gear. The second electric motor may be formed by two electric motors arranged in parallel, one respective electric motor being coupled to a driven wheel.

According to one embodiment of the invention, the consumer for an additional function of the industrial truck may be a hydraulic pump. For the purposes of braking, according to a further embodiment of the invention a controllable throttle may be associated with the hydraulic pump.

Different shift arrangements are conceivable for the two separate shafts and the two coupling shafts of the four-shaft gear consisting of two fixed links. One shift arrangement according to an embodiment of the invention provides that the first coupling shaft is formed by the spider shafts of the two planetary gears and the second coupling shaft is formed by the sun wheel shaft of the one planetary gear and the ring gear shaft of the other planetary gear. In a further embodiment of the invention it is provided that the first coupling shaft is formed by the ring gear shaft of the two planetary gears and the second coupling shaft is formed by the sun wheel shaft of the one planetary gear and the spider shaft of the other planetary gear.

In a further embodiment of the invention, the first coupling shaft is formed by the spider shafts of the two planetary gears and the second coupling shaft is formed by the sun wheel shaft of the two planetary gears. In a further embodiment of the invention, the first coupling shaft is formed by the spider shaft of the one planetary gear and the sun wheel shaft of the other planetary gear and the second coupling shaft is formed by the sun wheel shaft of the one planetary gear and the spider shaft of the other planetary gear.

According to a further embodiment of the invention the brake and the internal combustion engine may be arranged on a coupling shaft, the first electric motor as well as the change gear being able to be connected to the two separate shafts. Alternatively, the brake and internal combustion engine may be connected to the two separate shafts.

In a further embodiment of the invention, the planetary gears of one step of a four-shaft epicyclic gearing consisting of two fixed links may be designed as stepped planetary gears. Sun wheels may be provided instead of ring gears.

When using a four-shaft epicyclic gearing consisting of one fixed link, three-step planetary gears may be provided, the steps of the planetary gears being respectively in engagement with a sun wheel or ring gear and the fixed link, as well as the three gearwheels meshing with the planetary gears being respectively connected to a connecting shaft. Alternatively, it may be provided that the fixed link is provided with two-step planetary gears, a sun wheel and a ring gear being in engagement with the planetary gears of the one step as well as a sun wheel or ring gear with the planetary gears of the other step and the fixed link as well as the three gearwheels meshing with the planetary gears being respectively connected to a connecting shaft.

According to a further embodiment of the invention, the first electric motor may be designed as a hollow shaft motor and arranged concentrically about the one connecting shaft of the four-shaft epicyclic gearing. The second electric motor may also be designed as a hollow shaft motor, and arranged concentrically about the output shaft of the change gear. The summing gear may optionally be replaced by flanging the hollow shaft motor directly onto the output shaft of the change gear.

According to a further embodiment of the invention, the change gear and/or reversing gear may be designed as a four-shaft gearing consisting of two fixed links with two separate shafts and two coupling shafts, and arranged concentrically to the first four-shaft epicyclic gearing. The first shaft of the change gear or reversing gear may be connected to the output shaft of the first four-shaft epicyclic gearing, the second and the third shaft of the change gear and/or reversing gear, being coupled to a brake. The fourth shaft of the change gear and/or reversing gear is coupled to at least one driven wheel of the industrial truck. According to a further embodiment of the invention, the change gear and reversing gear is designed as a three-shaft epicyclic gearing, the first shaft of the change gear and reversing gear being able to be connected to the output shaft of the four-shaft epicyclic gearing, moreover the second shaft of the change gear and reversing gear being coupled to at least one driven wheel of the industrial truck, the third shaft of the change gear and/or reversing gear being able to be arrested by means of a brake and two shafts of the change gear and/or reversing gear being able to be connected to one another by means of a clutch. Alternatively, the change gear and/or reversing gear may also be designed as an auxiliary gear, the input shaft being able to be connected to the output shaft of the four-shaft epicyclic gearing, and the output shaft of the change gear and/or reversing gear being coupled to at least one driven wheel of the industrial truck.

In the drive system according to the invention, series mode with power generation, power split mode, mechanical mode, synchronous power shift as well as a change-over are possible. The invention also allows a combustion-driven operation of the additional function as well as an electromotive provision of the additional function. The drive system according to the invention also allows energy recuperation when lowering a load carrying means (effective lowering) as well as electromotive driving with zero emissions.

BRIEF DESCRIPTION OF THE SEVERAL VIEWS OF THE DRAWINGS

The invention is to be described in more detail hereinafter with reference to embodiments shown in the drawings, in which.

DETAILED DESCRIPTION OF THE INVENTION

Figure 1:
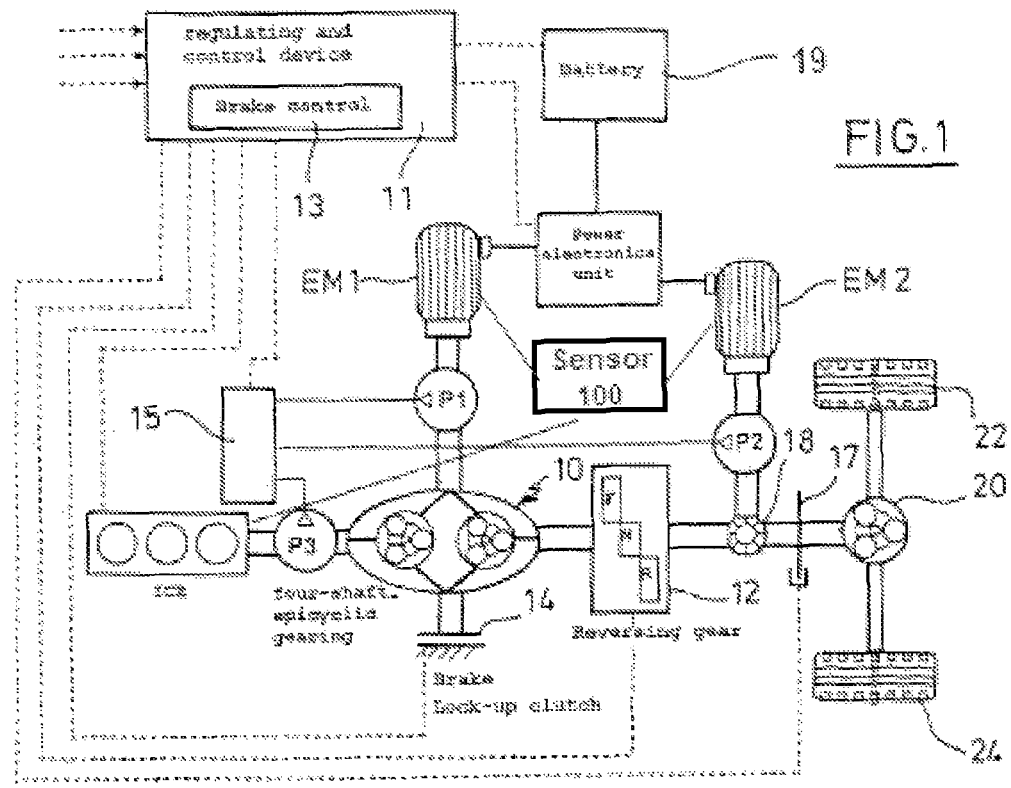
FIG. 1 shows schematically a drive system for an industrial truck according to the invention with a four-shaft epicyclic gearing.

While this invention may be embodied in many different forms, there are described in detail herein a specific preferred embodiment of the invention. This description is an exemplification of the principles of the invention and is not intended to limit the invention to the particular embodiment illustrated.

An internal combustion engine ICE is coupled to a first shaft of a four-shaft epicyclic gearing 10. A first electric motor EM1 is coupled to a second shaft of the epicyclic gearing 10. A reversing gear 12 is coupled to a further shaft of the epicyclic gearing 10, which comprises a forwards and reverse position as well as a neutral position. A fourth shaft of the epicyclic gearing 10 is coupled to a brake 14. The electric motor EM1 is electrically connected to a power electronics unit 16 containing a battery which is a component of an onboard power supply. Said power electronics unit is electrically connected to a second electric motor EM2. The shaft of the second electric motor EM2 is an input shaft of a summing gear 18, the second input shaft thereof being the output shaft of the reversing gear 12. The output shaft of the summing gear 18 is coupled via a differential gear 20 to the drive shafts of two driven wheels 22, 24. A first hydraulic pump P1 is driven by the shaft of the electric motor EM2, and a second hydraulic pump P2 is driven by the shaft of the second electric motor EM2. A third hydraulic pump P3 is driven by the output shaft of the internal combustion engine ICE.

A sensor device is associated with the drive system according to FIG. 1, which detects the speeds of the internal combustion engine ICE and the electric motors EM1 and EM2 as well as the temperatures of the internal combustion engine ICE and the electric motors EM1 and EM2 of the electrical accumulator, and the hydraulic medium for the transmission. The sensor is shown in FIG. 1 at 100, and is shown conductively connected to both the ICE and the electric motors EM1 and EM2. A control and regulating device 11 is shown which, according to setpoint signals of the setpoint generator actuated by the operator of the industrial truck, controls or regulates the speeds and/or torques of the internal combustion engine ICE and the electric motors EM1 and EM2, and, by taking as a basis the output signals of the sensor device, shifts the motor operation or generator operation of the electric motors EM1 and EM2 as well as controls the actuation of the change gear 10 and the brake 14. It also contains a brake control 13. Hereinafter a few typical operating modes of the industrial truck are disclosed with reference to the drive system according to FIG. 1.

By actuating the brake 14 on the four-shaft epicyclic gearing and disengaging the change gear 10, i.e. shifting into the neutral position, the power of the internal combustion engine ICE is transferred to the first electric motor EM1, which thus operates as a generator. The current generated in this manner may be utilised for charging the battery, for electrical consumers of the vehicle (not shown), for external electrical consumers (not shown), as well as drive current for the second electric motor EM2. The transmission ratio of the epicyclic gearing 10 results from the number of teeth of the gearwheels of the four-shaft epicyclic gearing.

A power split mode results when the brake 14 is released and the reversing gear 12 is shifted into the shift position belonging to the respective direction of travel. The power of the internal combustion engine ICE is partly mechanically transferred from the shaft of the epicyclic gearing 10, coupled to the reversing gear 12, to the summing gear 18 and partly electrically transferred from an electric motor EM1 via the power electronics unit 16 to the other electric motor EM2 and from there to the summing gear 18.

At high tensile force and low driving speed, the brake 14 is actuated and the reversing gear 12 is in the shift position belonging to the respective direction of travel. The power of the internal combustion engine ICE is mechanically transferred directly to the drive wheels 22, 24, both electric motors EM1 and EM2 being linked at a predetermined transmission ratio to the driving speed.

A transfer from the aforementioned series mode to the similarly disclosed power split mode is carried out by the brake 14 remaining actuated, the reversing gear 12 being shifted at the point of synchronous drive and output speed into the shift position belonging to the respective direction of travel and the power of the electric motors EM1 and EM2 being adjusted to the load status in power split mode. Then the brake 14 is released.

The transfer from series mode to power split mode is carried out by the second electric motor EM2 being adjusted such that it fully applies the output torque, the drive current being taken from the electrical accumulator (battery). Then the brake 14 is released and the speed of the internal combustion engine ICE and the first electric motor EM2 is adjusted such that the reversing gear 12 reaches the point of synchronous drive and output speed, after which it is shifted into the shift position belonging to the respective direction of travel. The internal combustion engine ICE and the two electric motors EM1 and EM2 are adjusted to the load status in power split mode.

The hydraulic pump P1 serves, for example, for the lifting and lowering function of the industrial truck. For initiating this function the brake 14 is actuated and the reversing gear 12 shifted into the neutral position. The power of the internal combustion engine ICE is mechanically coupled to the first electric motor EM1, the hydraulic pump PI being driven. An electromotive lifting and lowering results, by the power of the first electric motor EM1 being transferred to the consumer (hydraulic pump P1) which is coupled to the shaft of the first electric motor EM1, the electrical power being taken from the electrical accumulator (battery). In this case the brake 14 is released and the reversing gear 12 disengaged (neutral position). The internal combustion engine ICE may be switched off.

For recovering the energy when lowering the load carrying means in the industrial truck, the electric motor EM1 is driven via the hydraulic pump P1, which thus produces current in the manner of a generator which is supplied to the battery. In this connection the brake 14 is released and the reversing gear 12 disengaged.

During electromotive driving, the second electric motor EM2 fully applies the output torque, the drive current being taken from the electrical accumulator. The reversing gear 12 is disengaged and the internal combustion engine ICE may be switched off.

The drive system shown in FIG. 1 offers various braking possibilities. To this end, a brake control is provided (not shown). In the case of a low braking force the reversing gear 12 remains in the neutral position and/or is shifted into said position and the second electric motor EM2 is activated such that the braking torque is only applied thereby by braking produced by the generator. The current produced in the manner of a generator is used for charging the electrical accumulator (battery 19).

In the case of a high set braking force, the change gear and reversing gear remains in the shift position belonging to the respective direction of travel/speed and/or is shifted into said position. The second electric motor EM2 is controlled such that the permissible braking torque produced in the manner of a generator is applied and the current produced in the manner of a generator is used for charging the electrical accumulator. The internal combustion engine is driven into overrun mode (i.e. is merely carried along therewith). The first electric motor EM1 is activated such that the speed of the internal combustion engine ICE connected via the epicyclic gearing 10 adopts predetermined values, and the current produced in the manner of a generator is used to charge the electrical accumulator.

With very high braking force the reversing gear 12 is left in the neutral position or shifted into said position, as soon as falling below a predetermined driving speed. The second electric motor EM2 is controlled such that the braking torque is only applied by the second electric motor EM2 by braking produced by the generator. The brake 14 is actuated by the brake control 13. Moreover, the first electric motor EM1 is activated such that the internal combustion engine ICE connected to the epicyclic gearing 10 is accelerated, until the speed of the internal combustion engine ICE adopts specific predetermined values, the current produced in the manner of a generator by the second electric motor EM2 being at least partially consumed.

With very high braking force, a throttle associated with, for example, the hydraulic pump P1 is controlled such that when exceeding the predermined values for the speed of the internal combustion engine ICE an additional braking torque is generated. In FIG. 1 the pumps P1, P2 and P3 are connected to a valve block 15, which serves for supplying a plurality of consumers as well as a throttle arrangement for braking purposes. Moreover, on the wheel side of the reversing 12 and the second electric motor EM2 a further brake may be fitted. A brake 17 on the wheel side may generate an additional braking torque when exceeding the predermined values for the speed of internal combustion engine ICE.

Figure 2:
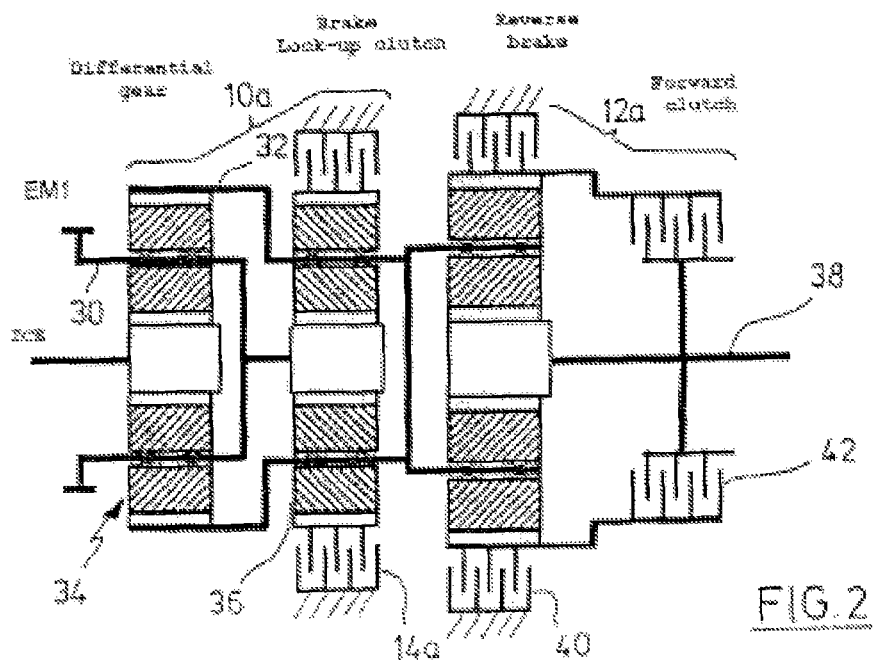
FIG. 2 shows schematically a four-shaft epicyclic gearing consisting of two fixed links and a reversing gear as a three-shaft epicyclic gearing.

Hereinafter, a few constructive embodiments for the four-shaft epicyclic gearing 10 and the reversing gear 12 are described according to FIG. 1. In FIG. 2, a four-shaft epicyclic gearing consisting of two fixed links 10a may be seen with two separate shafts and two coupling shafts, the first coupling shaft 30 being formed by the spider shafts of the one planetary gear system and the sun wheel shaft of the other planetary gear system 36. The second coupling shaft 32 is formed by the ring gear shaft of the one planetary gear system 34 and the spider shaft of the other planetary gear system 36. The epicyclic gearing is a differential drive and the brake 14a is coupled to the ring gear of the second planetary gear system 36. The reversing gear 12a is a three-shaft epicyclic gearing, the first shaft being connected to the output shaft of the four-shaft epicyclic gearing 10a and a second shaft being coupled to at least one driven wheel of the industrial truck. The output shaft is denoted by 38. A third shaft of the reversing gear 12a is provided with a brake 40 and may thus be arrested. Two shafts of the reversing gear 12a are able to be connected to one another by means of a clutch 42. In the case shown, said shafts are the shafts 38 and the shaft connected to the ring gear of the change gear.

Figure 3:
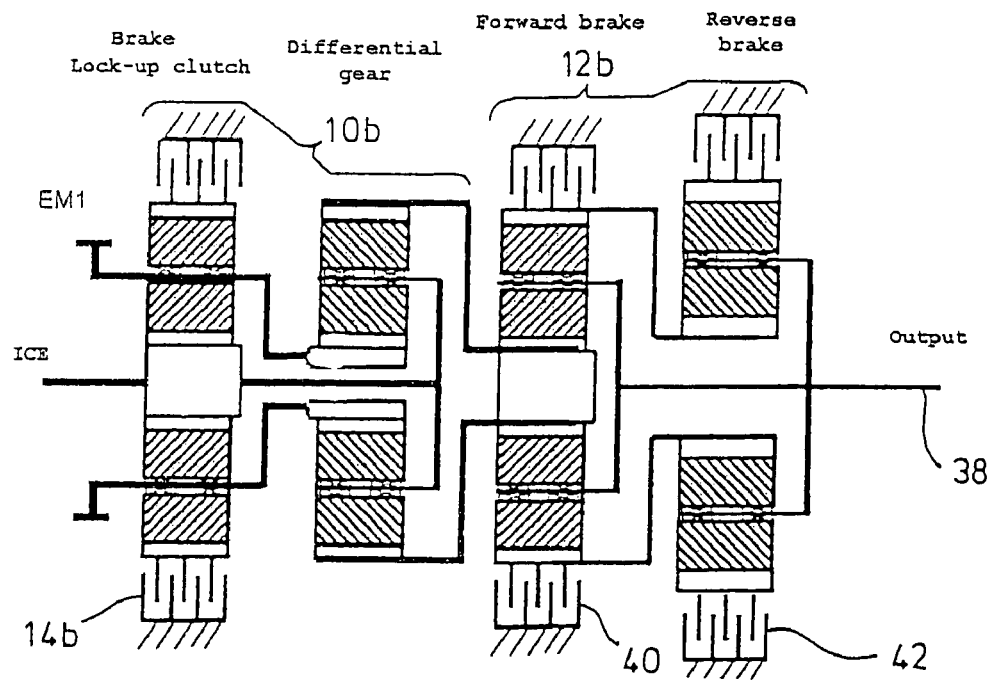
FIG. 3 shows a four-shaft epicyclic gearing consisting of two fixed links and a reversing gear as a four-shaft epicyclic gearing.

In FIG. 3 a four-shaft epicyclic gearing consisting of two fixed links 10b may be seen as well as the reversing gear 12b as a four-shaft epicyclic gearing. The first coupling shaft of the epicyclic gearing 10b is formed by the spider shaft of the one planetary gear system and the sun wheel shaft of the other planetary gear system and the second coupling shaft is formed by the sun wheel shaft of the one planetary gear system and the spider shaft of the other planetary gear system. In the reversing gear 12b, a brake 40 is associated with the one coupling shaft, the other coupling shaft being connected to the output 38.

Figure 4:
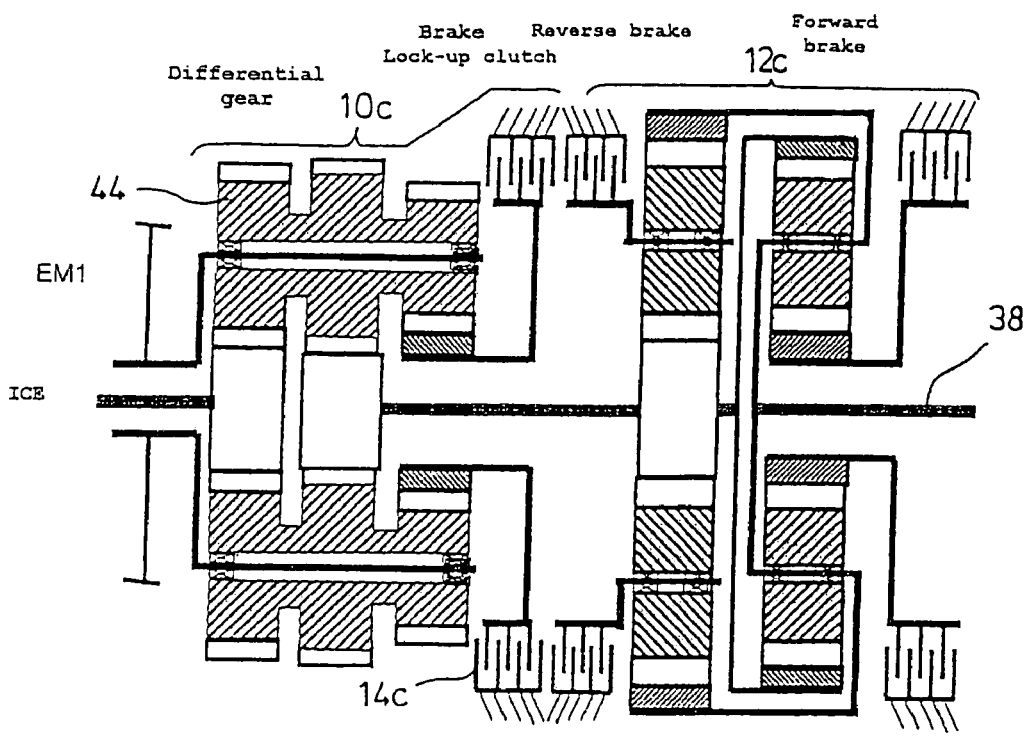
FIG. 4 shows a four-shaft epicyclic gearing consisting of one fixed link and a reversing gear as a four-shaft epicyclic gearing.

In FIG. 4 the epicyclic gearing 10c is a four-shaft epicyclic gearing consisting of one fixed link and the reversing gear 12c is a four-shaft epicyclic gearing 10e. The fixed link of the epicyclic gearing 10c is provided with three-step planetary gears 44, each step of the planetary gears being respectively in engagement with a sun wheel or ring gear. The fixed link as well as the three gearwheels meshing with the planetary gears 44 are respectively connected to a connecting shaft. The brake 14c is connected to the sun wheel coupled to the last step of the stepped planetary gears 44.

Figure 5:
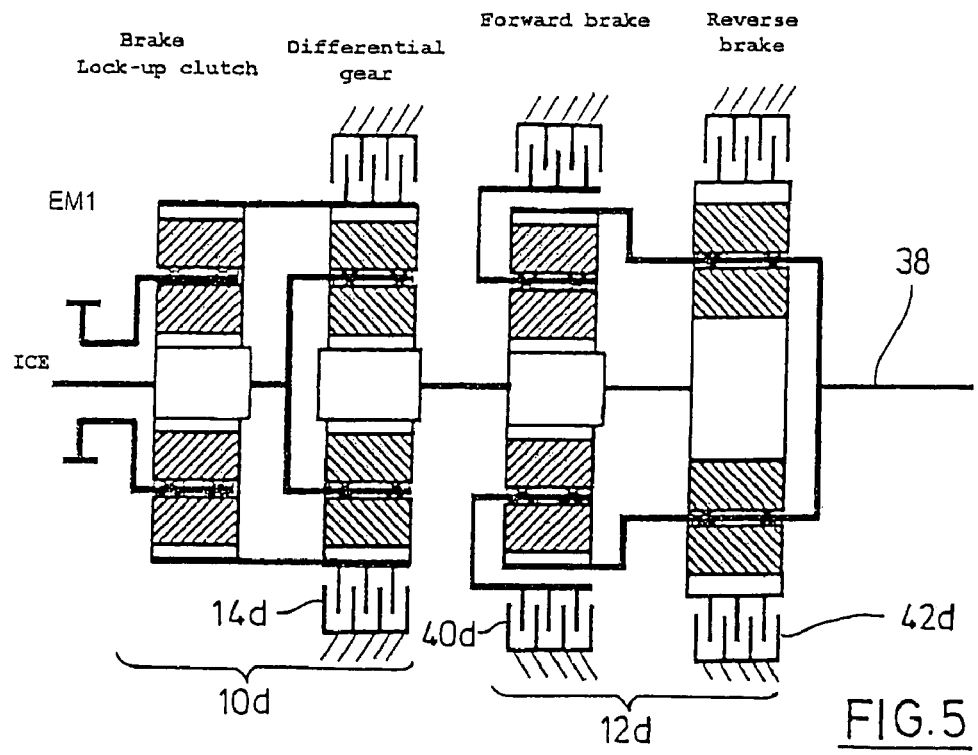
FIG. 5 shows a four-shaft epicyclic gearing consisting of two fixed links and a reversing gear as a four-shaft epicyclic gearing.

FIG. 5 shows a four-shaft epicyclic gearing consisting of two fixed links 10d and a reversing gear 12d as a four-shaft epicyclic gearing. A first coupling shaft is formed by the ring gear shafts of the two planetary gears. A second coupling shaft is formed by the sun wheel shaft of the one planetary gear system and the spider shaft of the other planetary gear system.

Figure 6:
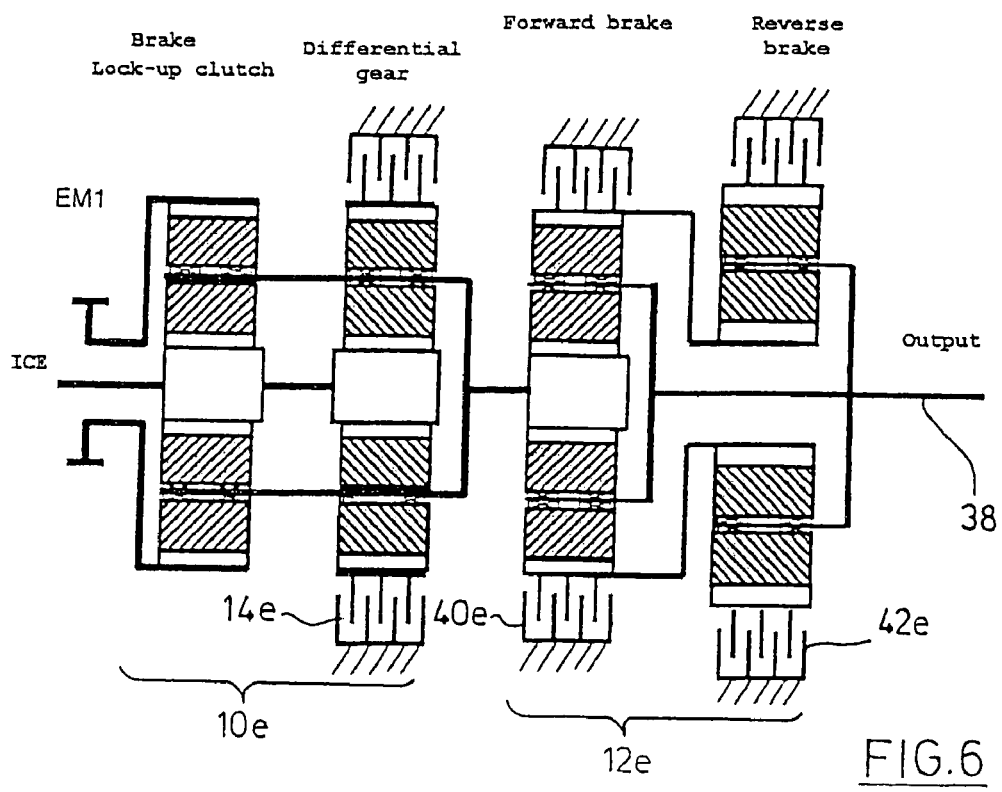
FIG. 6 shows a four-shaft epicyclic gearing consisting of two fixed links and a reversing gear as a four-shaft epicyclic gearing.

In the embodiment according to FIG. 6 the epicyclic gearing 10e is a four-shaft epicyclic gearing consisting of two fixed links and the reversing gear 12e is a four-shaft epicyclic gearing. The first coupling shaft of the epicyclic gearing 10e is formed by the spider shafts of the two planetary gear systems and the second coupling shaft is formed by the sun wheel shafts of the two planetary gear systems.

Figure 7:
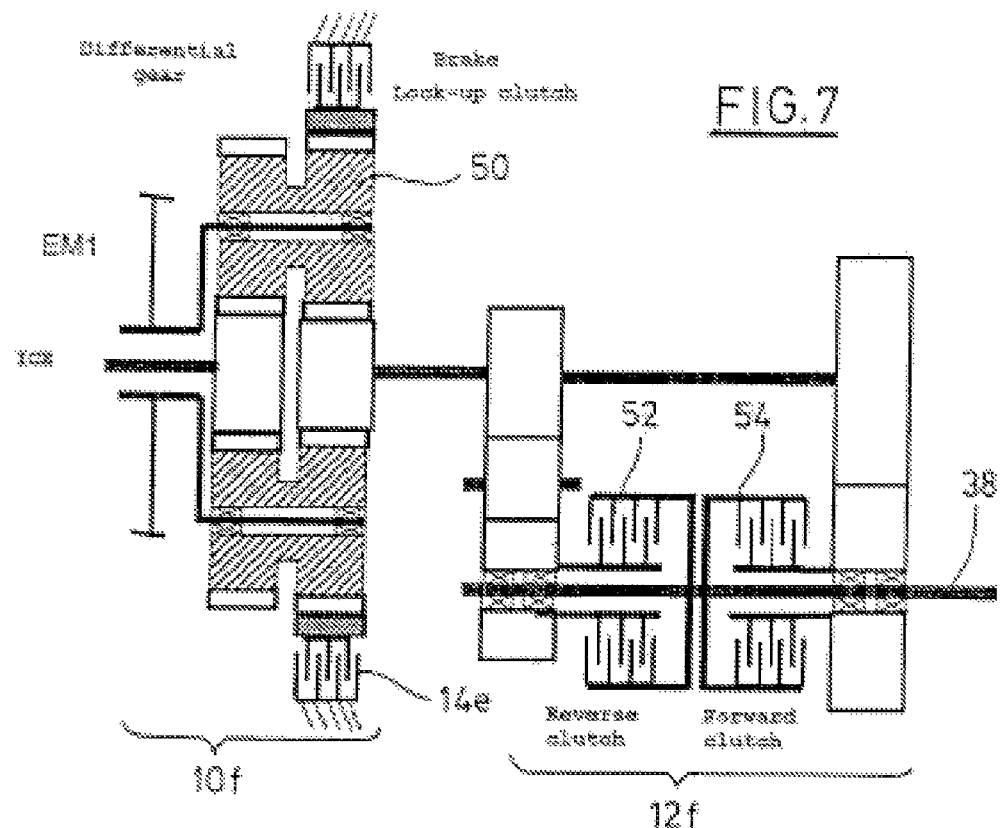
FIG. 7 shows a four-shaft epicyclic gearing consisting of one fixed link and a reversing gear as an auxiliary gear.

In FIG. 7 the reversing gear 12f is a four-shaft epicyclic gearing consisting of one fixed link with two-step planetary gears 50, a sun wheel and a ring gear being in engagement with the planetary gears of the one step as well as a sun wheel or ring gear being in engagement with the planetary gears of the other step. The fixed link as well as the three gearwheels meshing with the planetary gears 50 are respectively connected to a connecting shaft. The reversing gear 12f is an auxiliary gear, the input shaft of the reversing gear 12f being connected to the output shaft of the epicyclic gearing 10f and the output shaft of the reversing gear 12f being coupled to at least one driven wheel (not shown here) of the industrial truck. The rotational direction of the output shaft 38 depends on which of the two clutches 52, 54 is actuated. The gear ratio of the reversing gear consists of three gearwheels meshing with one another and the other gear ratio of two gearwheels meshing with one another so that, depending on the actuation of the clutch, one of the other rotational direction results.

Figure 8:
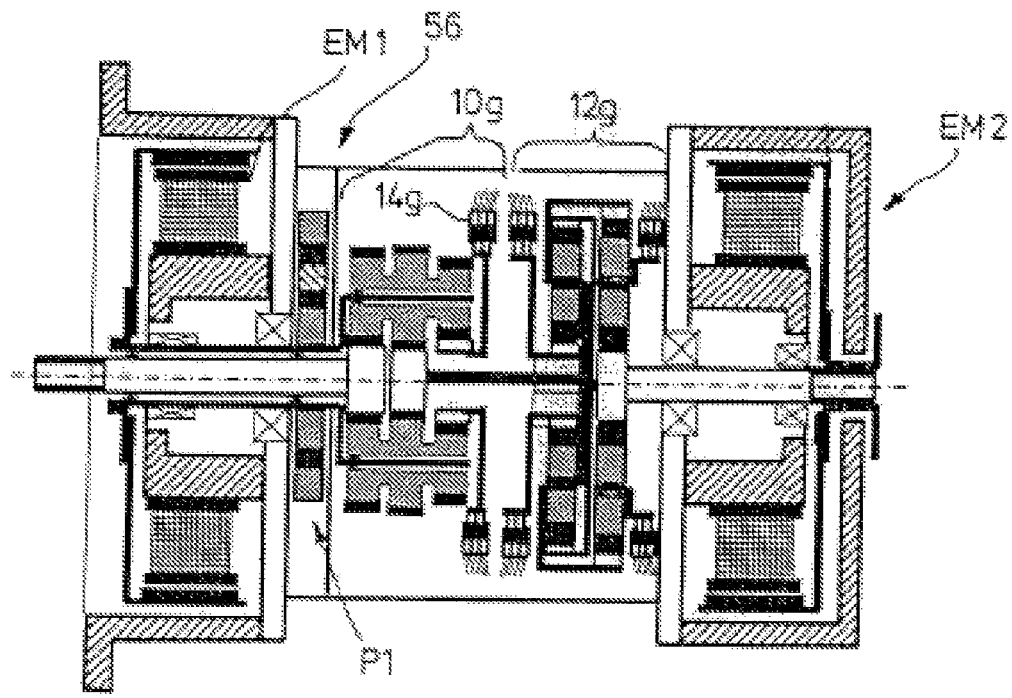
FIG. 8 shows a drive system according to the invention as a structural unit with hollow shaft electric motors.

In FIG. 8 a gear housing 56 is shown in which first and second electric motors EM1 and EM2 are arranged coaxially and at an axial distance from one another. The second electric motor EM2 is concentrically arranged about the output shaft of the reversing gear 12g. The summing gear (see FIG. 1) is replaced by flanging the electric motor EM2 directly onto the output shaft of the reversing gear 12g. The four-shaft epicyclic gearing is a four-shaft epicyclic gearing consisting of one fixed link, as is shown in FIG. 4. The reversing gear 12g is a four-shaft epicyclic gearing. A concentrically arranged hydraulic pump P1 is directly driven by the hollow shaft of the first electric motor EM1.

Figure 9:
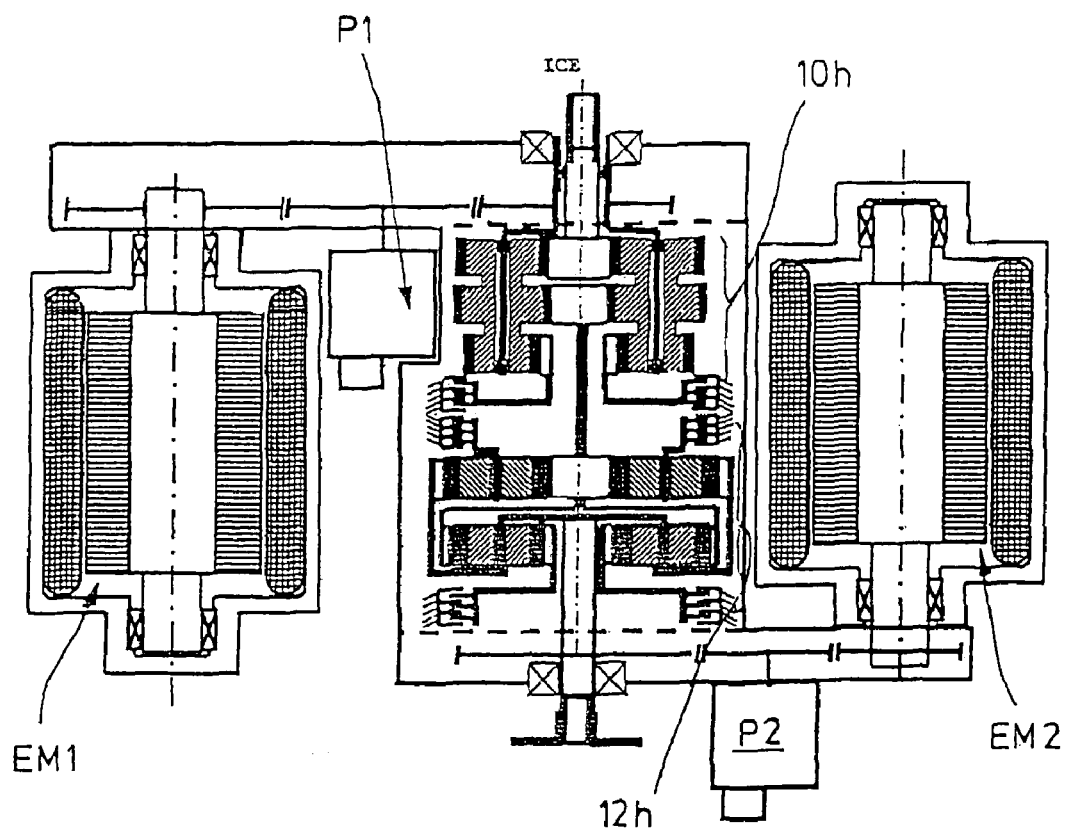
FIG. 9 shows a drive system according to the invention as a structural unit with laterally arranged electric motors and hydraulic pumps on the output side.

In FIG. 9 an alternative to the arrangement according to FIG. 8 is shown, in which the electric motors EM1 and EM2 are arranged with their shafts parallel and at a distance from one another. The epicyclic gearing 10h and the reversing gear 12h are the same as that of the drive system according to FIG. 8. A second hydraulic pump P2 is driven by the shaft of the second electric motor EM2 by corresponding gears and/or by the output shaft of the reversing gear 12h.

Figure 10:
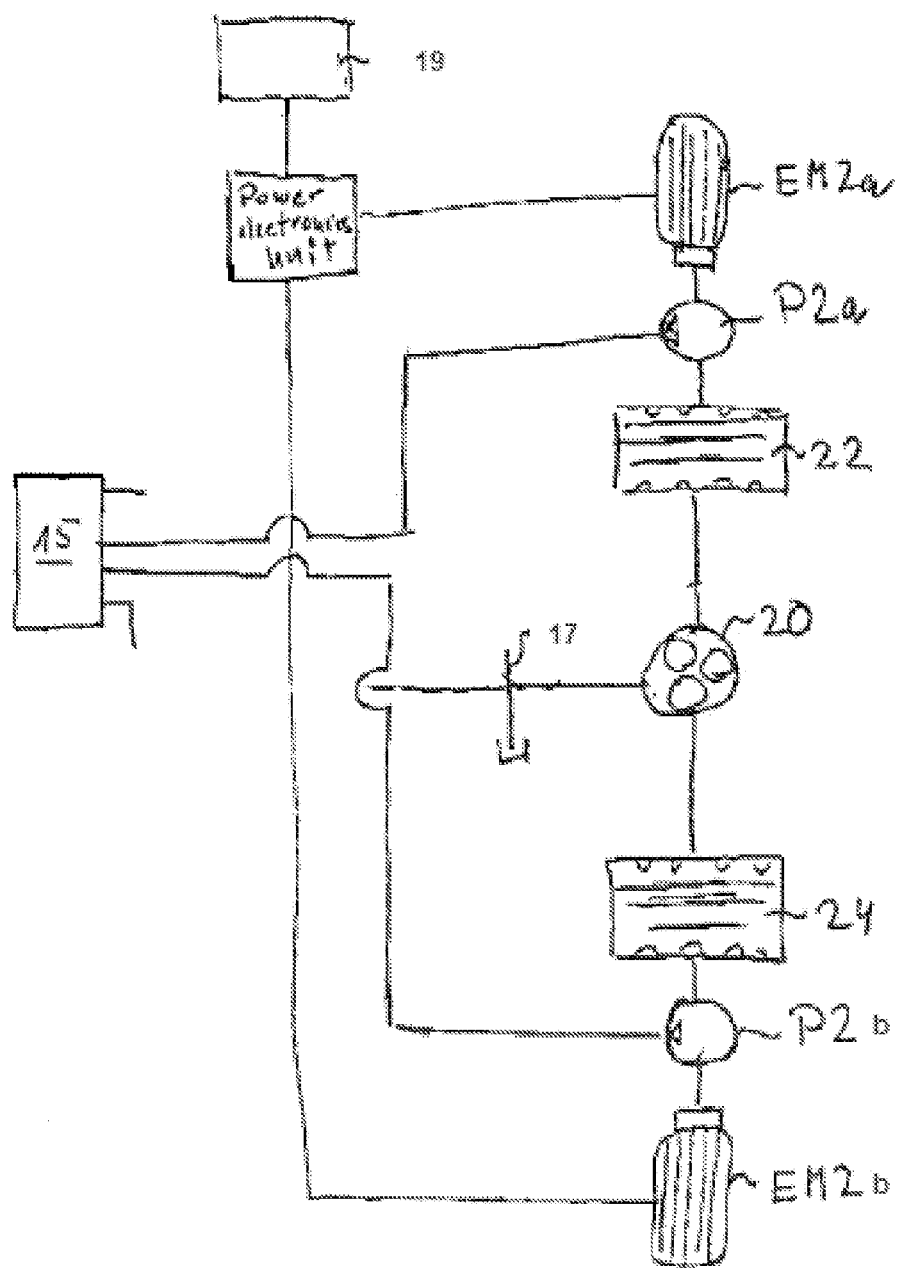
FIG. 10 shows an embodiment of the invention.

FIG. 10 shows an embodiment of the invention, with electric motors EMa and EMb, each connected respectively to hydraulic pump P2a and P2b.

It should be understood that the brake 14 may be an electromagnetic brake, a disc brake or a multiple disc brake. It should further be understood that the sensor device detects the temperature of the regulating and control device. It should further be understood that the control and regulating device controls the power of the internal combustion engine and the motors such that predetermined values for the operating temperatures are not exceeded. It should further be understood that additional braking torque is produced when the deviation of the braking deceleration of the vehicle from the set value exceeds a predetermined value. It should further be understood that various elements of the drive system are controlled to start the internal combustion engine, namely:

that by actuating the brake on the four-shaft epicyclic gearing and disengaging the change gear, the power of the first electric motor is transferred to the internal combustion engine and said internal combustion engine is started; or that the internal combustion engine is started during travel, by the second electric motor fully applying the output torque, the drive current being taken from the electrical accumulator and the change gear being shifted into the shift position belonging to the respective direction of travel and the first electric motor being activated such that the torque required for starting is applied to the internal combustion engine, the brake on the four-shaft epicyclic gearing being disengaged, and finally that the internal combustion engine is started during travel, by the second electric motor fully applying the output torque, the drive current being taken from the electrical accumulator and the brake on the four-shaft epicyclic gearing being actuated and the change gear being shifted into the shift position belonging to the respective direction of travel, the first electric motor being activated such that the torque required for starting is applied to the internal combustion engine.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction. In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Drive system for an industrial truck comprising an internal combustion engine, a four-shaft epicyclic gearing comprising two or one fixed links with which a first shaft may be connected to a shaft of the internal combustion engine, a first electric motor which is mechanically coupled to a second shaft of the four-shaft epicyclic gearing and is electrically connected to an onboard power supply of the vehicle, a brake coupled to a fourth shaft of the four-shaft epicyclic gearing, a change gear coupled to a third shaft of the four-shaft epicyclic gearing, an output shaft of the change gear being connected to a second electric motor connected electrically to the onboard power supply and the output shaft of the change gear being coupled to at least one driven wheel of the industrial truck, at least one consumer for at least one additional function of the vehicle which is coupled to one of the shafts of the epicyclic gearing, a sensor device which detects the speed of the internal combustion engine and the first and second electric motor and generates corresponding signals, and a control and regulating device which controls or regulates the speeds and/or torques of the electric motors and the internal combustion engine according to setpoint signals of a set value generator actuated by the operator of the industrial truck and by taking as a basis the output signals of the sensor device, switches the motor operation or generator operation of the electric motors and controls the actuation of the change gear and the brake.

2. The drive system according to claim 1, characterized in that the change gear is a reversing gear.

3. The drive system according to claim 1, characterized in that the second electric motor is formed by two electric motors arranged in parallel which are respectively connected to a drive wheel.

4. The drive system according to claim 1, characterized in that the consumer for the additional function of the vehicle is coupled to the shaft of the first electric motor.

5. The drive system according to claim 1, characterized in that at least one further consumer is provided for an additional function of the vehicle, which is arranged on a wheel side of the change gear or the second electric motor.

6. The drive system according to claim 1, characterized in that the consumer for the additional function of the vehicle is a hydraulic pump.

7. The drive system according to claim 6, characterized in that at least one hollow shaft-hydraulic pump (P1) is provided which is arranged concentrically to a gear shaft.

8. The drive system according to claim 6, characterized in that at least one hydraulic pump is provided, operating in both rotational directions.

9. The drive system according to claim 6, characterized in that for braking purposes one controllable throttle (15) is associated with at least one hydraulic pump (P1).

10. The drive system according to claim 1, characterized in that at least one brake (17) is arranged on a wheel side of the change gear or the second electric motor (EM2).

11. The drive system according to claim 1, characterized in that the brake is an electromagnetic brake, disc brake or multiple disc brake.

12. The drive system according to claim 1, characterized in that a sensor device detects the temperatures of the internal combustion engine and/or the first and second electric motor and/or the control and regulating device (11) and/or the electrical accumulator and/or the hydraulic means and generates corresponding temperature signals and the control and regulating device controls the power of the internal combustion engine and the electric motors by taking as a basis the output signals of the sensor device such that predetermined values for the operating temperatures are not exceeded.

13. The drive system according to claim 1, characterized in that in the four-shaft epicyclic gearing comprising two fixed links, with two separate shafts and two coupling shafts, the first coupling shaft is formed by a spider shaft of the one planetary gear system and a sun wheel shaft of the other planetary gear system and the second coupling shaft is formed by a ring gear shaft of the one planetary gear system and a spider shaft of the other planetary gear system.

14. The drive system according to claim 1, characterized in that in the four-shaft epicyclic gearing comprising two fixed links, with two separate shafts and two coupling shafts, the first coupling shaft is formed by a ring gear shafts of the two planetary gear systems and the second coupling shaft is formed by a sun wheel shaft of the one planetary gear system and a spider shaft of the other planetary gear system.

15. The drive system according to claim 1, characterized in that in the four-shaft epicyclic gearing comprising two fixed links, with two separate shafts and two coupling shafts, the first coupling shaft is formed by a spider shafts of the two planetary gear systems and the second coupling shaft is formed by a sun wheel shafts of the two planetary gear systems.

16. The drive system according to claim 1, characterized in that in the four-shaft epicyclic gearing comprising two fixed links, with two separate shafts and two coupling shafts, the first coupling shaft is formed by a spider shaft of the one planetary gear system and a sun wheel shaft of the other planetary gear system and the second coupling shaft is formed by a sun wheel shaft of the one planetary gear system and a spider shaft of the other planetary gear system.

17. The drive system according to claim 1, characterized in that in the four-shaft epicyclic gearing comprising two fixed links, the internal combustion engine is connected to the first shaft, the first electric motor to the second shaft and the brake as well as the change gear to the fourth and third shafts.

18. The drive system according to claim 1, characterized in that in the four-shaft epicyclic gearing comprising two fixed links, with two separate shafts and two coupling shafts, the internal combustion engine is connected to one of the coupling shafts, the change gear to the other coupling shaft and the brake as well as the first electric motor to the two separate shafts.

19. The drive system according to claim 1, characterized in that the first electric motor is configured as a hollow shaft motor and is arranged concentrically about one of the shafts of the four-shaft epicyclic gearing.

20. The drive system as claimed in claim 1, characterized in that the second electric motor is designed as a hollow shaft motor and is arranged concentrically about the output shaft of the change gear.

21. The drive system according to claim 1, characterized in that the first and the second electric motors are arranged laterally adjacent to the four-shaft epicyclic gearing and/or the change gear.

22. The drive system according to claim 1, characterized in that in the change gear a neutral position as well as two or more gears may be engaged.

23. The drive system according to claim 1, characterized in that the change gear and/or a reversing gear is designed as a four-shaft gearing comprising two fixed links with two separate shafts and two coupling shafts and is arranged concentrically to the first four-shaft epicyclic gearing, the first shaft of the change gear and/or reversing gear being able to be connected to the output shaft of the first four-shaft epicyclic gearing, the second and third shaft of the change gear and/or reversing gear being coupled to one respective brake and the fourth shaft of the change gear and/or reversing gear being coupled to at least one driven wheel of the industrial truck.

24. The drive system according to claim 1, characterized in that in the change gear and/or a reversing gear as the four-shaft epicyclic gearing comprising two fixed links, the brake and a second brake are arranged on two separate shafts of the four-shaft epicyclic gearing.

25. The drive system according to claim 1, characterized in that in the change gear and/or a reversing gear as the four-shaft epicyclic gearing comprising two fixed links, one brake is arranged on a coupling shaft, a second brake is arranged on a separate shaft.

26. The drive system according to claim 1, characterized in that the change gear and/or a reversing gear is designed as a three-shaft epicyclic gearing, the first shaft of the change gear and/or reversing gear being able to be connected to the output shaft of the four-shaft epicyclic gearing, the second shaft of the change gear and/or reversing gear being coupled to at least one driven wheel of the industrial truck, the third shaft of the change gear and/or reversing gear being able to be arrested by means of a brake and two shafts of the change gear and/or reversing gear being able to be connected to one another by means of a clutch.

27. The drive system according to claim 1, characterized in that the change gear and/or a reversing gear is designed as an auxiliary gear, the input shaft of the change gear and/or reversing gear being able to be connected to the output shaft of the four-shaft epicyclic gearing, and the output shaft of the change gear and/or reversing gear being coupled to at least one driven wheel of the industrial truck.

28. The drive system according to claim 1, characterized in that the onboard power supply is provided with an electrical accumulator and a vehicle brake control in the case of a low set braking force, leaves and/or shifts the change gear in the neutral position and controls the second electric motor such that the braking torque is only applied by the second electric motor by braking produced by the generator and the current produced in the manner of a generator is used to charge the electrical accumulator.

29. The drive system according to claim 1, characterized in that the onboard power supply is provided with an electrical accumulator and a vehicle brake control in the case of a high set braking force leaves and/or shifts the change gear into the shift position belonging to the respective direction of travel/vehicle speed and controls the second electric motor such that sufficient braking torque generated by the second motor is applied and the current produced in the manner of a generator is used to charge the electrical accumulator, controls the internal combustion engine in driven mode and controls the first electric motor such that the speed of the internal combustion engine connected via the four-shaft epicyclic gearing adopts specific, predetermined values and the current produced in the manner of a generator is used to charge the electrical accumulator.

30. The drive system according to claim 1, characterized in that a vehicle brake control leaves and/or shifts the change gear in the neutral position, as soon as falling below a predetermined vehicle speed and controls the second electric motor such that the braking torque is only applied by the second electric motor by braking produced by a generator, the vehicle brake control actuates the brake coupled to the four-shaft epicyclic gearing and which controls the first electric motor such that the internal combustion engine connected to the four-shaft epicyclic gearing is accelerated, until the speed of the internal combustion engine adopts specific predetermined values, the current produced by the second electric motor in the manner of a generator being at least partially consumed.

31. The drive system according to claim 1, characterized in that a vehicle brake control controls a throttle of a hydraulic pump such that when exceeding predetermined values for the speed of the internal combustion engine, an additional braking torque is produced.

32. The drive system according to claim 1, characterized in that a vehicle brake control (13) is provided which controls a throttle (15) of at least one hydraulic pump (P2), such that an additional braking torque is produced when the deviation of the braking deceleration of the vehicle from the set value exceeds a predetermined value.

33. The drive system according to claim 1, characterized in that a vehicle brake control controls a brake (17) on a wheel side, such that it generates an additional braking torque when exceeding the predetermined values for the speed of the internal combustion engine (ICE).

34. The drive system according to claim 1, characterized in that a vehicle brake control, controls at least one brake (17) on a wheel side such that an additional braking torque is produced, when the deviation of the braking deceleration of the vehicle from the set value exceeds a predetermined value.

35. A method for operating the drive system according to claim 34, comprising the steps of the transition from series mode to power split mode takes place by the second electric motor being adjusted such that it fully applies the output torque, the drive current being taken from an electrical accumulator, then the brake on the four-shaft epicyclic gearing being released, the speed of the internal combustion engine and the first electric motor being regulated such that the change gear reaches the point of synchronous drive and output speed, after which the shift position belonging to the respective direction of travel is engaged and the internal combustion engine and the two electric motors are adjusted to the load status in power split mode.

36. A method for operating the drive system according to claim 1, comprising the steps of actuating the brake on the four-shaft epicyclic gearing and disengaging the change gear, the power of the internal combustion engine being transferred to the first electric motor and the first electric motor operates as a generator, the current produced in this manner being used for charging a battery for electrical consumers of the vehicle, external electrical consumers or as drive current for the second electric motor.

37. A method for operating the drive system according to claim 36, comprising the steps of a transition from series mode to power split mode takes place by the brake remaining actuated on the four-shaft epicyclic gearing, the change gear being shifted at the point of synchronous drive and output speed into the shift position belonging to the respective direction of travel, the power of the internal combustion engine (ICE) and the electric motors being adjusted to the load status in power split mode and then the brake on the four-shaft epicyclic gearing is released.

38. Method for operating a drive system according to claim 1, characterized in that the brake on the four-shaft epicyclic gearing is released and the change gear and/or a reversing gear is shifted into a shift position belonging to a respective direction of travel and the power of the internal combustion engine is partly transferred mechanically to a summing gear, partly electrically by one of the electric motors via the onboard power supply to the other electric motor and from said electric motor to the summing gear.

39. The drive system according to claim 38, characterized in that the brake on the four-shaft epicyclic gearing (10) is actuated at the point of the zero crossing speed of the shaft to which the brake (14) is connected.

40. A method for operating the drive system according to claim 1, comprising the steps of in a specific operating range, at high tensile force and low driving speed the brake on the four-shaft epicyclic gearing is actuated and the change gear is left and/or shifted into a shift position belonging to a respective direction of travel and the power of the internal combustion engine is mechanically transferred directly to the drive wheel, both electric motors being linked at a predetermined ratio with the vehicle speed.

41. A method for operating the drive system according to claim 1, comprising the steps of a transition from power split mode to series mode takes place by the brake on the four-shaft epicyclic gearing being actuated, at the point of the zero crossing speed of the shaft to which the brake is connected, the power of the internal combustion engine and the electric motors being adjusted to the load status in series mode and then the change gear being shifted into the neutral position.

42. A method for operating the drive system according to claim 1, comprising the steps of by actuating the brake on the four-shaft epicyclic gearing and disengaging the change gear, the power of the internal combustion engine is transferred to the consumer for the additional functions of the vehicle, and which is coupled to the shaft of the first electric motor.

43. A method for operating the drive system according to claim 1, comprising the steps of by actuating the brake on the four-shaft epicyclic gearing and disengaging the change gear, the power of the first electric motor is transferred to the internal combustion engine and said internal combustion engine is started.

44. A method for operating the drive system according to claim 1, comprising the steps of the power of the first electric motor is transferred to the consumer for the additional functions of the vehicle and which is coupled to the shaft of the first electric motor, the electrical power being taken from an electrical accumulator, the brake on the four-shaft epicyclic gearing being released and the change gear being disengaged.

45. Method for operating the drive system according to claim 1, comprising the steps of the power of the consumer for the additional function of the vehicle which is coupled to the shaft of the first electric motor, is transferred to the first electric motor and said electric motor produces current in the manner of a generator, which is supplied to the electrical accumulator, the brake on the four-shaft epicyclic gearing being released and the change gear being disengaged.

46. A method for operating the drive system according to claim 1, comprising the steps of the second electric motor fully applies the output torque, the drive current being taken from an electrical accumulator and the change gear being disengaged.

47. A method for operating the drive system according to claim 1, comprising the steps of the internal combustion engine is started during travel, by the second electric motor fully applying the output torque, the drive current being taken from an electrical accumulator and the change gear being shifted into the shift position belonging to the respective direction of travel and the first electric motor being activated such that the torque required for starting is applied to the internal combustion engine, the brake on the four-shaft epicyclic gearing being disengaged.

48. A method for operating the drive system according to claim 1, comprising the steps of the internal combustion engine is started during travel, by the second electric motor fully applying the output torque, the drive current being taken from an electrical accumulator and the brake on the four-shaft epicyclic gearing being actuated and the change gear being shifted into the shift position belonging to the respective direction of travel, the first electric motor being activated such that the torque required for starting is applied to the internal combustion engine.

* * * * *